(12) United States Patent
Blue

(10) Patent No.: US 9,086,844 B2
(45) Date of Patent: Jul. 21, 2015

(54) INVOKING A USER ENVIRONMENT BASED ON DEVICE COVER

(75) Inventor: George M. Blue, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 13/611,660

(22) Filed: Sep. 12, 2012

(65) Prior Publication Data

US 2014/0071036 A1   Mar. 13, 2014

(51) Int. Cl.
*G06F 3/01* (2006.01)
*G06F 1/16* (2006.01)
*G06F 3/0481* (2013.01)

(52) U.S. Cl.
CPC ............ *G06F 1/1626* (2013.01); *G06F 3/0481* (2013.01); *G06F 2200/1634* (2013.01)

(58) Field of Classification Search
CPC ............ H04M 1/0283; H04M 1/0252; H04M 1/72575; G06F 3/045; G06F 1/1616; G06F 1/16; G06F 1/1626
USPC ................. 345/173–174; 379/433.01, 433.11; 455/90.3, 550.1, 556.1, 575.1; 235/439–440, 472.02
See application file for complete search history.

(56) References Cited

U.S. PATENT DOCUMENTS

| | | | |
|---|---|---|---|
| 7,221,939 B2 | 5/2007 | Ylitalo et al. | |
| 8,138,869 B1 | 3/2012 | Lauder et al. | |
| 8,143,982 B1 | 3/2012 | Lauder et al. | |
| 8,143,983 B1 | 3/2012 | Lauder et al. | |
| 8,242,868 B2 | 8/2012 | Lauder et al. | |
| 8,733,648 B2 * | 5/2014 | Melbrod et al. | 235/435 |
| 2002/0030103 A1 * | 3/2002 | Wycherley et al. | 235/439 |
| 2002/0173295 A1 * | 11/2002 | Nykanen et al. | 455/414 |
| 2004/0203656 A1 | 10/2004 | Andrew et al. | |
| 2005/0136842 A1 | 6/2005 | Fan et al. | |
| 2010/0267377 A1 | 10/2010 | Chiu et al. | |
| 2010/0282953 A1 * | 11/2010 | Tam | 250/226 |
| 2012/0175496 A1 * | 7/2012 | Vorovitchik | 250/206.2 |
| 2012/0194448 A1 | 8/2012 | Rothkopk | |

(Continued)

FOREIGN PATENT DOCUMENTS

DE   102013217384 A1   3/2014
WO   WO 03007584 A1 *   1/2003

OTHER PUBLICATIONS

"Mobile Device with Automatic Mode Configuration Based on Location". Technical Disclosure. IP.com Prior Art Database at: <http://www.ip.com/pubview/IPCOM000176952D>. IP.com No. IPCOM000176952D. Dec. 1, 2008. Copyright IP.com.

(Continued)

*Primary Examiner* — Alexander Eisen
*Assistant Examiner* — Abhishek Sarma
(74) *Attorney, Agent, or Firm* — Patricia B. Feighan

(57) ABSTRACT

A device cover includes a device cover identifier. A computing device includes a device cover identifier reader for reading the device cover identifier, and the computing device invokes a user environment associated with the device cover identifier. The user environment can include an arrangement of home screen program icons, executing application programs, computing device notification settings, device or application usernames and passwords, brightness levels, or display screen wallpaper. The device cover identifier can include one or more magnets, an RFID tag, color, intensity, or polarity of light passing through the cover, or textual or graphical information on the cover.

12 Claims, 8 Drawing Sheets

(56) References Cited

U.S. PATENT DOCUMENTS

2013/0109371 A1* 5/2013 Brogan et al. ............... 455/420
2013/0181935 A1* 7/2013 Mckenzie et al. ........... 345/174

OTHER PUBLICATIONS

IBM. "Method and Apparatus to Control Cell Phone Disturbances During Meetings without the Use of Specialized Control Devices". Technical Disclosure. IP.com Prior Art Database at: <http://www.ip.com/pubview/IPCOM000185185D>. IP.com No. IPCOM000185185D. Jul. 14, 2009. Copyright IP.com.

"Method to Detect and Switch Mobile Phones in Silent Mode Based on Local Peer Behavior". Technical Disclosure. IP.com Prior Art Database at: <http://www.ip.com/pubview/IPCOM/000216753>. IP.com No. IPCOM000216753D. Apr. 17, 2012. Copyright IP.com.
Slivka, E. "Apple Researching iPad Smart Covers with Secondary Displays, Keyboards, Solar Cells-MacRumors". Aug. 2, 2012. [online] Retrieved from the Internet at: <http:www//macrumors.com/2012/08/02/apple-researching-ipad-smart-covers-with-secondary-displays-keyboards-solar-cells/>.

* cited by examiner

INVOKING A USER ENVIRONMENT BASED ON DEVICE COVER

FIELD OF THE INVENTION

The present invention relates generally to the field of portable computing devices, and more particularly to invoking a user environment based on a device cover identifier.

BACKGROUND OF THE INVENTION

The trend towards miniaturization and portability has resulted in the development of notebook and netbook computers, and the tablet PC. The relatively small sizes of these computing devices makes them easy to carry around, and their ever-increasing processing power allows a single computing device to be used for both work and leisure applications. A common accessory for such computing devices is a cover or carrying case. Due to the wide variety of colors, patterns, and graphic designs that ornament these covers and cases, different covers and cases can be used in different situations, such as work, school, home, etc. For certain tablet PCs, when a compatible device cover is attached to the tablet and in a closed position, the tablet PC is automatically put into sleep mode. Similarly, when the cover is partially or totally opened, the tablet wakes up.

In computing devices, and mobile computing devices in particular, a device profile is a particular set of device settings that are typically situationally applied. For example, mobile devices typically include configurable and/or adjustable features, such as ring volume, ring tones, ring modes (e.g., ring versus vibrate), business or personal call screening/filtering, alert/notification volume or tone, alert/notification visual effects, and a variety of other variable features or settings. Any number of these mobile device settings may be grouped into different device profiles. Depending on the particular situation of the mobile device, the mobile device user may want to change device profiles. For example, if the user is attending a meeting, a "quiet" device profile may be desirable, in which the notification and ring volumes are switched from audible to vibrate.

Certain smartphones have the ability to change device profiles based on the time of day or location of the smartphone. For example, the user may desire to have the ring volume set to a lower setting during nighttime hours or when the phone is physically located at work.

SUMMARY

Embodiments of the present invention disclose a method, computer program product, and system for invoking a computing device user environment based on a device cover identifier. A device cover includes a device cover identifier. A computing device includes a device cover identifier reader for reading the device cover identifier, and the computing device invokes a user environment associated with the device cover identifier. The user environment can include an arrangement of home screen program icons, executing application programs, computing device notification settings, device or application usernames and passwords, brightness levels, or display screen wallpaper. The device cover identifier can include one or more magnets, an RFID tag, color, intensity, or polarity of light passing through the cover, or textual or graphical information on the cover.

DETAILED DESCRIPTION

Figure 1:
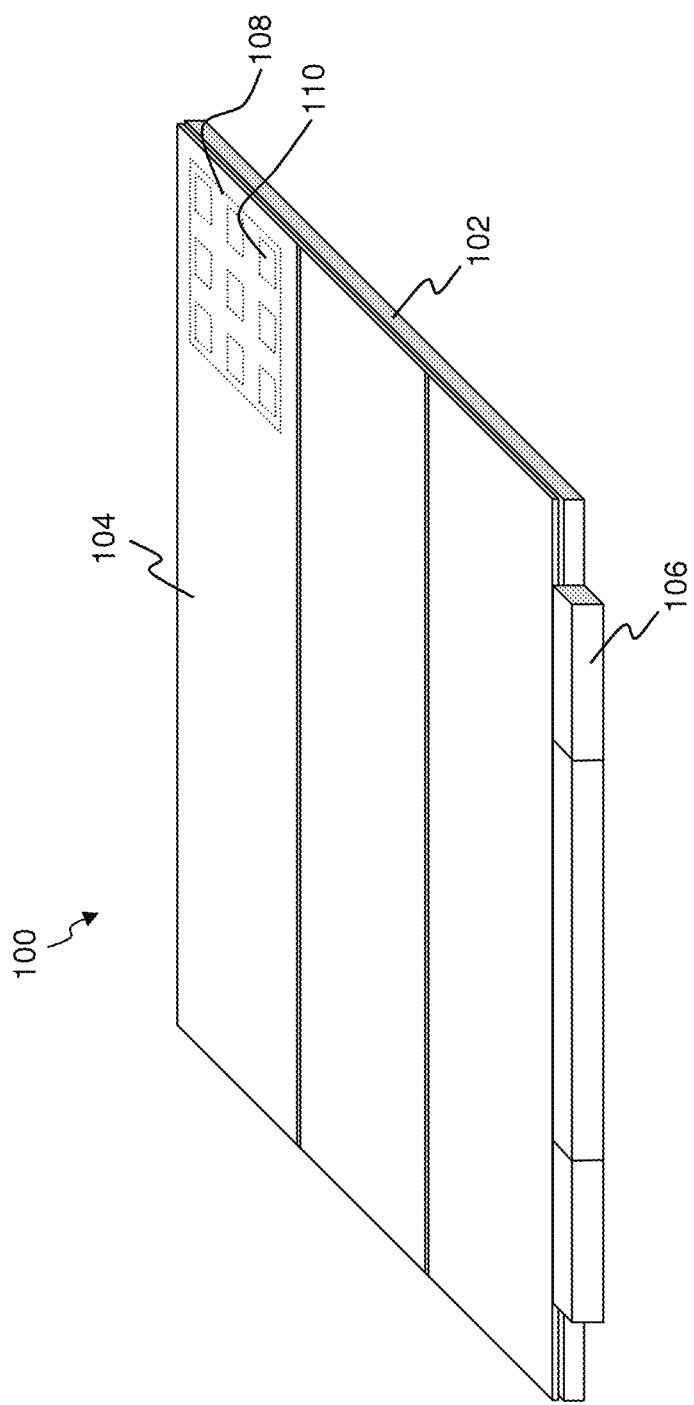
FIG. 1 is a perspective view of a computing device and device cover system with a device cover identifier embodied in a magnet array embedded in the device cover, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Embodiments of the present invention describe a system in which a computing device user environment, which includes a device profile component, is invoked based on a device cover identifier attached to a device cover or carrying case.

A user environment, which includes various device settings in the form of a device profile, further includes the interactive application environment presented to a device user. For a tablet computing device, a user environment can include, for example, the arrangement of application icons on the home pages, which application icons are visible, applications that are invoked when the tablet wakes up, device or application usernames and passwords, and a device profile appropriate for the situation of the tablet device. For example, a user environment definition for a work situation may have the application icons arranged such that the most used business applications appear prominently on the first home page, the calendar application is invoked to display upcoming events, the email application is started, and an appropriate device profile is invoked.

The present invention will now be described in detail with reference to the Figures. FIG. 1 is a perspective view of a computing device and device cover system 100 with a device cover identifier embodied in a magnet array 108 embedded in device cover 104, in accordance with an embodiment of the present invention. In a preferred embodiment, computing device and device cover system 100 includes a tablet computing device 102 and computing device cover 104. As illustrated, computing device cover 104 is disposed on the face of tablet computing device 102. As shown in the exemplary embodiment, computing device cover 104 is segmented into three parts connected, for example, by a living hinge, and includes a hinge portion 106 that magnetically attaches the device cover to tablet computing device 102 along the back edges of both the device cover and the tablet computing device. In an exemplary embodiment, computing device cover 104 includes magnet array 108 that includes one or more magnets 110. The specific magnetic field generated by the one or more magnets 110 is detected by a magnetically sensitive circuit (not shown) in tablet computing device 102, and, as explained in more detail below with respect to FIG. 7, the tablet computing device may invoke a user environment associated with the specific magnetic field. In the exemplary embodiment, the magnetically sensitive circuit or detector includes one or more Hall Effect sensors, typically a combination of latching sensors and linear sensors, the outputs of which can indicate magnetic flux density, or magnetic field strength, and the magnetic polarity of the magnetic field in the vicinity of the sensors. The flux density and magnetic field strength outputs of the one or more Hall Effect sensors can be used to identify a specific device cover identifier. Different arrangements of magnets 110 of magnet array 108 will produce different flux densities and magnetic field strengths, and can be used to produce a sufficient number of different device cover identifiers. The sufficient number device cover identifiers, i.e., the number of different identifiers needed to reasonably guarantee that a purchaser of several different covers will not have a duplicate identifier, is governed by such factors as how many different covers a consumer is likely to purchase, whether all covers of the same design will have the same identifier, how random the distribution of identifiers will be among different device cover styles, how random the distribution of identifiers will be within a shipment of device covers, how many different types of device cover identifiers will be used, etc.

For illustrative purposes, a particular arrangement of magnets 110 is shown. However, any arrangement of magnets, including variations in magnetic field strength, magnetic polarity, magnet size, magnet position, etc., may be used that satisfies an embodiment of the invention. In a preferred embodiment, the flux density of the magnets is high enough to be detected by the one or more Hall Effect sensors, but not so great as to materially interfere with other magnetically sensitive components of tablet computing device 102 or other magnetically sensitive components that may come into close proximity to magnets 110, such as the magnetic strips on credit cards. Such considerations may also affect the positioning of magnets 110 and the corresponding Hall Effect sensors within device cover 104 and tablet computing device 102, respectively. In certain embodiments, a threshold flux density is defined such that the magnetically sensitive circuit can detect when magnets 110 are a distance away from tablet computing device 102 corresponding to the removal of device cover 104 from the face of tablet computing device 102. In alternative embodiments, magnetic shunts may be used to modify the flux density field of the one or more magnets 110. In other alternative embodiments, a cooperating arrangement of magnets (not shown) in tablet device 102 can be used to produce the flux densities and magnetic field strengths of a specific different device cover identifier. The cooperating arrangement of magnets can be varied device to device to assist in producing a sufficient number of different device cover identifiers. In other alternative embodiments, magnets 110 can be incorporated into the magnetic hinge portion 106, and may serve a dual purpose of attaching device cover 104 to a computing device 102, and also producing a specific flux density and magnetic field strength output that can be used as a device cover identifier.

Figure 2:
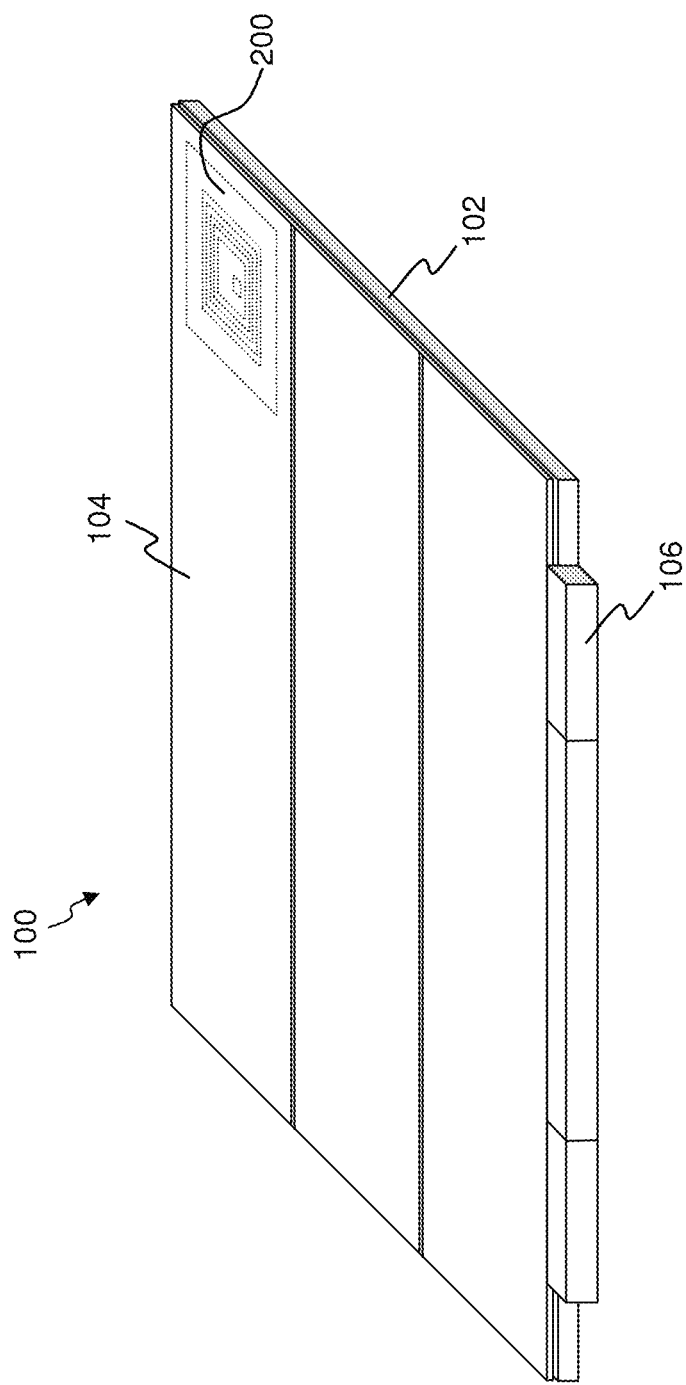
FIG. 2 is a perspective view of a computing device and device cover system with a device cover identifier embodied in an RFID tag embedded in the device cover, in accordance with an embodiment of the present invention.

FIG. 2 is a perspective view of computing device and device cover system 100 with a device cover identifier embodied in an radio frequency identification (RFID) tag 200 embedded in device cover 104, in accordance with an embodiment of the present invention. In this exemplary embodiment, device cover 104 includes RFID tag 200, and tablet device 102 includes a corresponding RFID tag reader (not shown) for reading the RFID tag. RFID is a technology by which electromagnetic waves are transmitted from a reader device to an RFID tag. When the tag is in the interrogation zone of the reader, identifying information is transmitted by the tag to the reader. Although a particular style of RFID tag 200 is shown, the form factors of RFID tags vary greatly. The tags can range from the size of a pin head to several square inches. While any suitable RFID tag and corresponding reader satisfying an embodiment of the invention may be used, considerations such as cost, durability, and size may influence the particular choice of RFID tag in a particular implementation. In this exemplary embodiment, the identifying information transmitted by RFID tag 200 is associated with a particular user environment.

Figure 3:
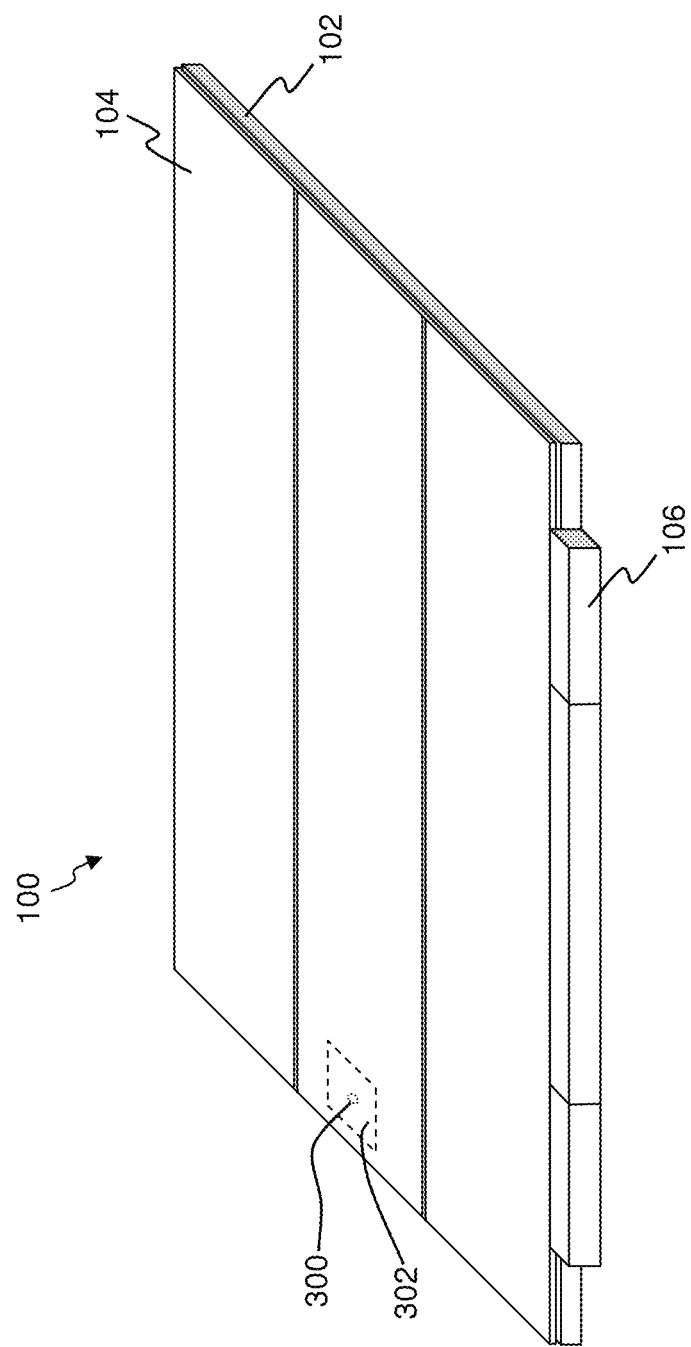
FIG. 3 is a perspective view of a computing device and device cover system with a device cover identifier embodied in a translucent portion of the device cover, in accordance with an embodiment of the present invention.

FIG. 3 is a perspective view of computing device and device cover system 100 with a device cover identifier embodied in a translucent portion 302 of the device cover, in accordance with an embodiment of the present invention. In this exemplary embodiment, device cover 104 includes a translucent portion 302 positioned such that camera lens 300 of a camera device of tablet computing device 102 can detect light passing through translucent portion 302. While a specific portion of device cover 104 is indicated as being translucent (translucent portion 302) the entire device cover can be translucent. In this exemplary embodiment, the camera device of tablet computing device 102 detects one or more characteristics of light passing through translucent portion 302 into camera lens 300. Information regarding the light characteristics is then made available by the camera to querying applications. The characteristics can include, for example the color or color distribution, intensity, and polarity of the light received by camera lens 300 through translucent portion 302. In alternative embodiments, the light received by camera lens 300 may be light generated by the camera flash and reflected off of an interior portion of device cover 104 adjacent to camera lens 300. In these embodiments, it is not necessary that portion 302 of device cover 104 be translucent.

In these exemplary embodiments, a particular characteristic of the light passing through or reflected off of the device cover, or two or more characteristics in combination, are associated with a particular user environment.

Figure 4:
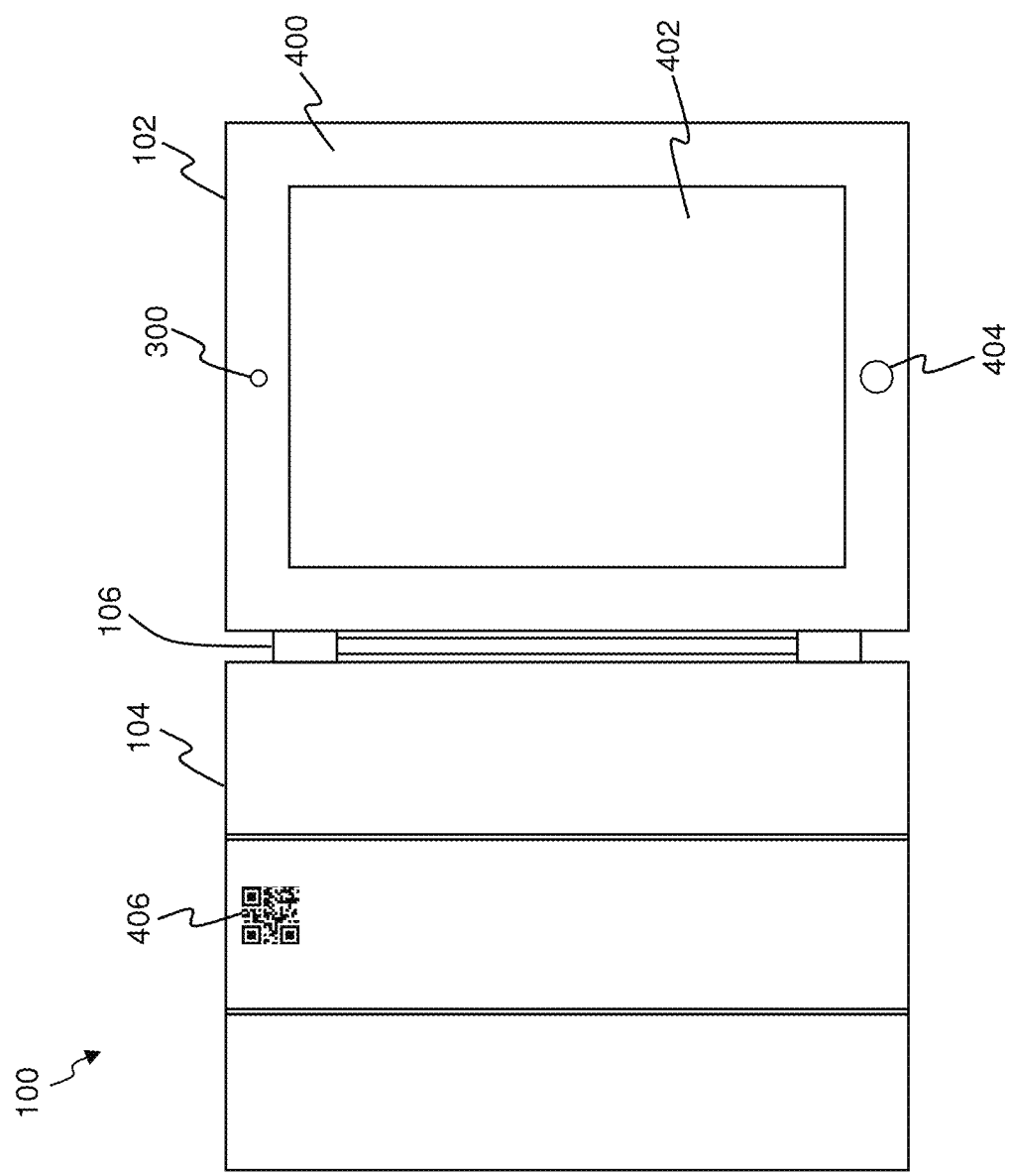
FIG. 4 is a plan view of a computing device and device cover system with a device cover identifier embodied in a QR code imprinted on the device cover, in accordance with an embodiment of the present invention.

FIG. 4 is a plan view of computing device and device cover system 100 with a device cover identifier embodied in textual or graphical information, in this case a Quick Response (QR) code 406, which is a specific type of matrix or two-dimensional graphical identification code, imprinted on the device cover, in accordance with an embodiment of the present invention. In this exemplary embodiment, device cover 104 includes QR code 406 imprinted on the device cover and is positioned such that camera lens 300 of a camera device of tablet computing device 102 can read QR code 406. While a particular type of textual or graphical information in the form of a QR code is illustrated, other one- or two-dimensional information codes, such as text or barcodes, may be used. In this exemplary embodiment, the camera device of tablet computing device 102, in conjunction with one or more associated optical applications, detects and interprets QR code 406. A particular QR code is associated with a particular user environment. Also illustrated on the face of tablet computing device 102 are bezel 400, screen area 402, and home button 404.

Figure 5:
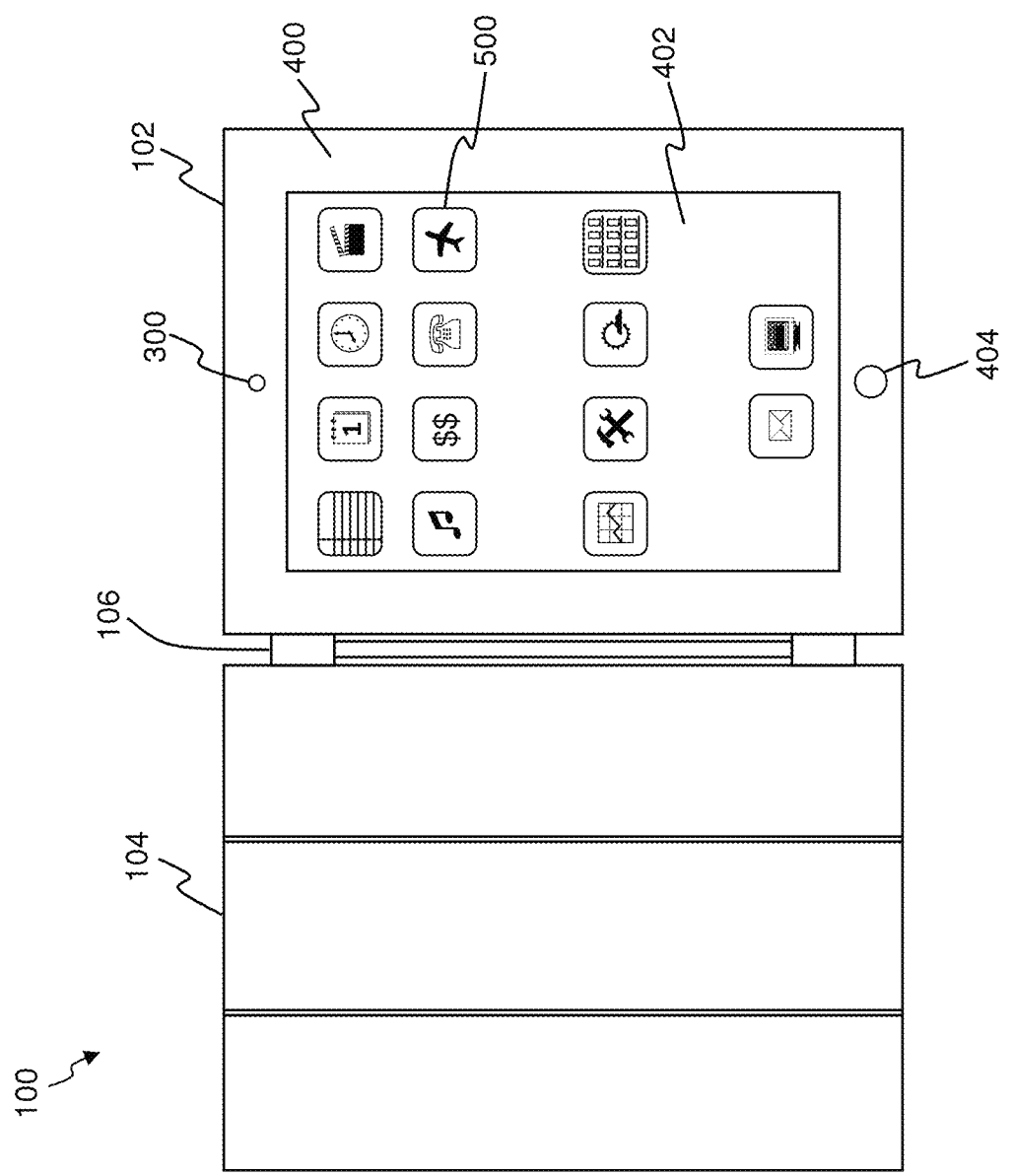
FIG. 5 is a plan view of a computing device and device cover system illustrating an aspect of a user environment in an arrangement of home page application icons, in accordance with an embodiment of the present invention.

FIG. 5 is a plan view of computing device and device cover system 100 illustrating an aspect of a user environment in an arrangement of home page application icons 500, in accordance with an embodiment of the present invention. In this exemplary embodiment, a particular home screen arrangement of application icons 500 displayed in screen area 402 are defined as appropriate for a particular situation of tablet computing device 102, and included in the associated user environment definition. The user environment definition may include additional icon arrangements and device settings not illustrated. As explained in more detail below with respect to FIG. 7, this user environment may be invoked when the associated device cover identifier is detected by one of the methods described above with respect to FIGS. 1-4.

Figure 6:
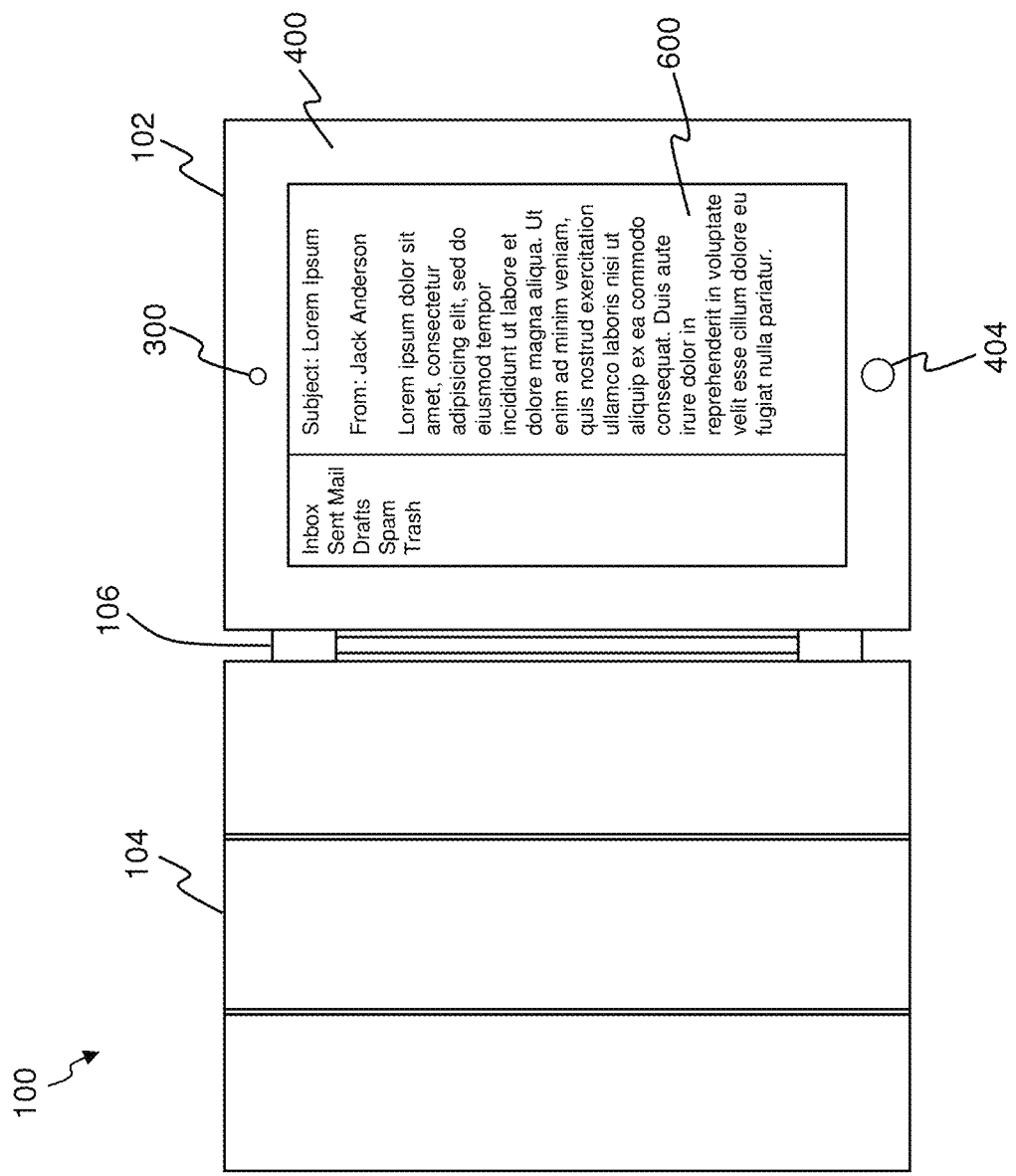
FIG. 6 is a plan view of a computing device and device cover system illustrating an aspect of a user environment in the execution of an email application, in accordance with an embodiment of the present invention.

Similarly, FIG. 6 is a plan view of computing device and device cover system 100 illustrating another aspect of a user environment in the execution of an email application, in accordance with an embodiment of the present invention. In this exemplary embodiment, a user environment includes the execution of an email application 600. The user environment definition may include additional icon arrangements, device settings, and other executing applications not illustrated. As explained in more detail below with respect to FIG. 7, this user environment may be invoked when the associated device cover identifier is detected by one of the methods described above with respect to FIGS. 1-4.

Figure 7:
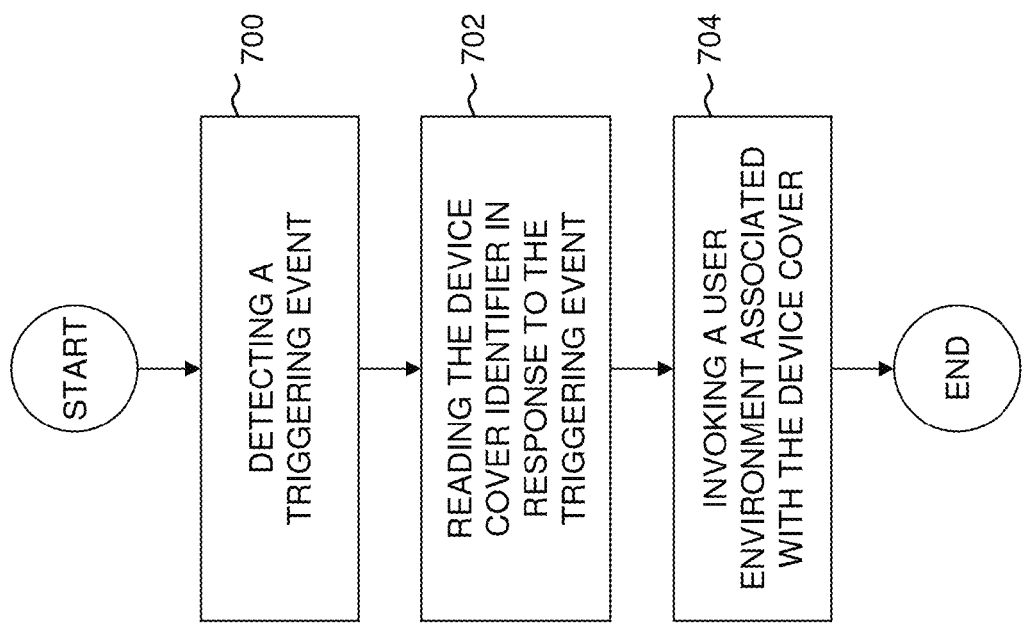
FIG. 7 is a flowchart depicting operational steps of the logic for invoking a user environment based on a device cover, in accordance with an embodiment of the present invention.

FIG. 7 is a flowchart depicting operational steps of the logic for invoking a user environment based on device cover 104, in accordance with an embodiment of the present invention. In embodiments of the invention, detecting a triggering event (step 700) causes computing device 102 to read the device cover identifier. In exemplary embodiments, the triggering event can occur when a portion of device cover 104 is removed from the face of computing device 102. In certain embodiments, the triggering event causes computing device 102 to wake up if it is in a sleep mode. For example, with respect to the exemplary embodiment illustrated in FIG. 1, the triggering event occurs when the magnetically sensitive circuit detects that the magnetic flux density drops below a threshold value when magnets 110 move away from tablet computing device 102. This typically occurs when the portion of device cover 104 containing magnets 110 is being removed from the face of tablet computing device 102. In alternative embodiments, one or more latching magnets can be embedded in device cover 104 for keeping the cover in a closed position against the face of tablet device 102. One or more associated magnetically sensitive circuits, for example, Hall Effect sensors, can detect when the cover is removed from the face of computing device 102 by the drop in magnetic flux density detected by the associated Hall Effect sensors. In other embodiments, the triggering event occurs when the magnets associated with hinge mechanism 106 are attached to or removed from computing device 102. In still other embodiments, the triggering event can be any combination of the detection of changes, presence, or absence of magnetic flux or polarity, with respect to one or more threshold values, associated with the magnets attached to or embedded in device cover 104, and/or the detection of changes, presence, or absence of characteristics associated with a device cover identifier.

With respect to the exemplary embodiment illustrated in FIG. 2, detecting that device cover 104 is removed from the face of computing device 102 occurs when the RFID reader detects a significant drop in signal strength from RFID tag 200. Alternatively, Hall Effect sensors detect when latching magnets are removed from the face of tablet computing 102. Similarly, with regard to the exemplary embodiments illustrated in FIGS. 3 and 4, Hall Effect sensors detect when latching magnets embedded in device cover 104 are removed from the face of tablet computing device 102.

In a preferred embodiment, after tablet computing device 102 detects the triggering event (step 700), the device cover identifier is read by the tablet computing device (step 702). Several embodiments of cover device identifiers and how the identifiers can be read have been described above with respect to FIGS. 1-4. However, these are presented by way of examples and are not intended to be exclusive or limiting.

After the device cover identifier is read by tablet computing device 102 (step 702), the device invokes a user environment associated with the device cover identifier (step 704). Those having skill in the art will recognize that various methods exist for creating, reading, invoking, and updating a device profile, and for invoking applications that reside on a device.

Figure 8:
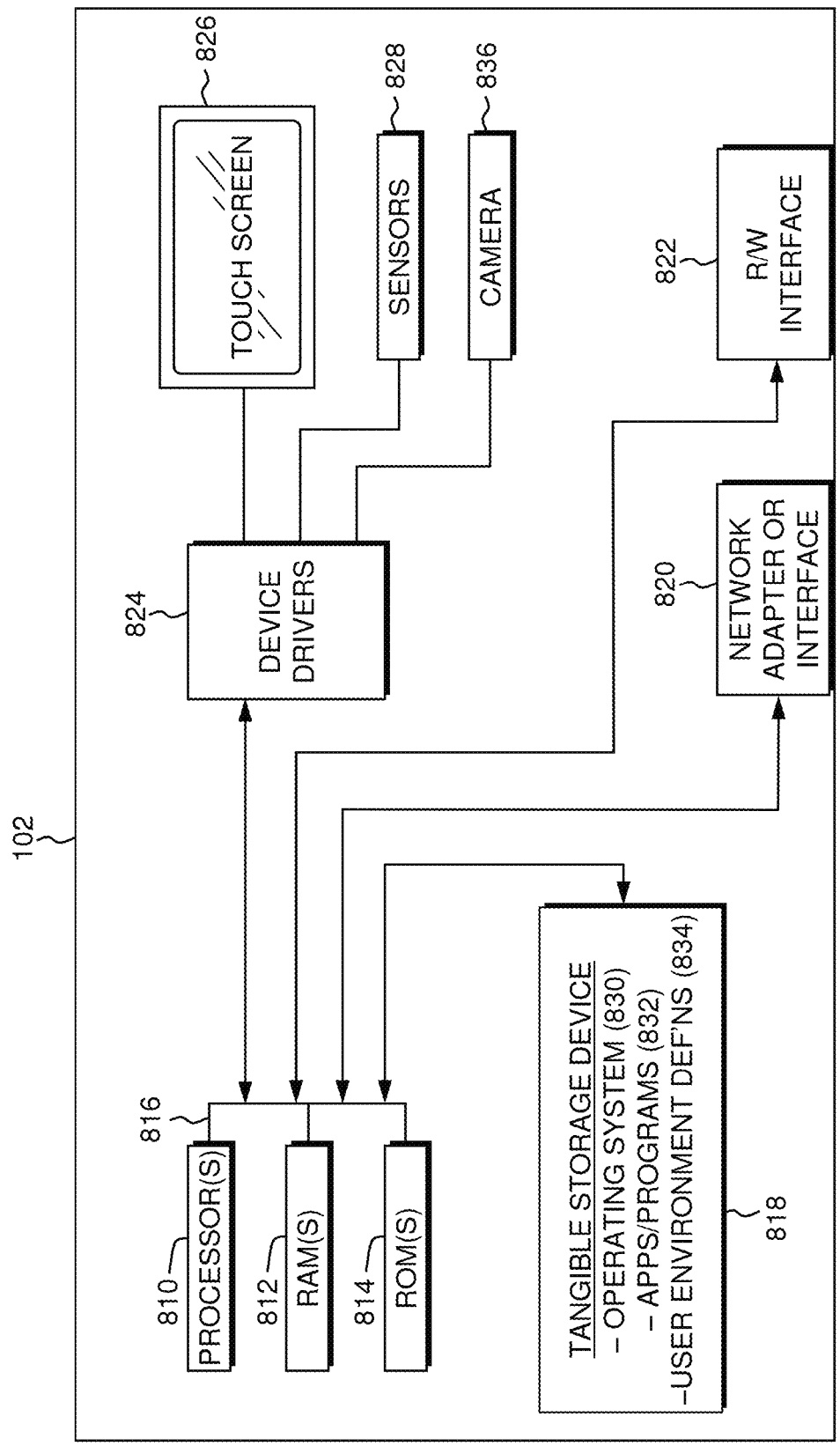
FIG. 8 is a block diagram of components of a computing device for invoking a user environment based on a device cover, in accordance with an embodiment of the present invention.

FIG. 8 is a block diagram of components of a computing device 102 for invoking a user environment based on a device cover, in accordance with an embodiment of the present invention. In an exemplary embodiment, computing device 102 includes one or more processors 810, one or more computer-readable RAMs 812, one or more computer-readable ROMs 814, and one or more computer-readable tangible storage devices 818 on one or more buses 816. One or more operating systems 830, one or more apps or programs 832, and one or more user environment definitions 834 are stored on the one or more computer-readable tangible storage devices 818 for execution by one or more of the processors 810 via one or more of the RAMs 812 (which typically include cache memory). In the illustrated embodiment, each of the computer-readable tangible storage devices 818 is a semiconductor storage device such as ROM 814, EPROM, flash memory or any other computer-readable tangible storage device that can store a computer program and digital information. Alternatively, each of the computer-readable tangible storage devices 818 is a magnetic disk storage device of an internal hard drive.

Computing device 102 also includes a read/write (R/W) interface 822, for example, a USB port, to read from and write to external computing devices or one or more portable computer-readable tangible storage devices such as a CD-ROM, DVD, memory stick, magnetic disk, optical disk or semiconductor storage device. The apps and programs 832 and the user environment definitions 834 can be stored on the external computing devices or one or more of the portable computer-readable tangible storage devices, read via the R/W interface 822 and loaded onto the computer-readable tangible storage device 818.

Computing device 102 also includes a network adapter or interface 820, such as a TCP/IP adapter card or wireless communication adapter (such as a 4G wireless communication adapter using OFDMA technology). The apps and programs 832 and the user environment definitions 834 can be downloaded to computing device 102 from an external computer or external storage device via a network (for example, the Internet, a local area network, a wide area network, or a wireless network) and network adapter or interface 820. From the network adapter or interface 820, the apps and programs 832 and the user environment definitions 834 are loaded into computer-readable tangible storage device 818. The network may comprise copper wires, optical fibers, wireless transmission, routers, firewalls, switches, gateway computers and/or edge servers.

Computing device 102 also includes a touch screen 826, a camera 836, sensors 828, for example, touch screen sensors and magnetically sensitive circuits, and device drivers 824 to interface to touch screen 826 for imaging, to sensors 828 for pressure sensing of alphanumeric character entry and user selections and for detecting magnetic flux and polarity. The device drivers 824, R/W interface 822 and network adapter or interface 820 comprise hardware and software (stored in computer-readable tangible storage device 818 and/or ROM 814).

It should be appreciated that FIG. 8 provides only an illustration of one implementation and does not imply any limitations with regard to the environments in which different embodiments may be implemented. Many modifications to the depicted environment may be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method and program product have been disclosed for selecting a user environment based on a device cover. However, numerous modifications and substitutions can be made without deviating from the scope of the present invention. Therefore, the present invention has been disclosed by way of example and not limitation.

What is claimed is:

1. A system for invoking a computing device user environment based on a device cover identifier, the system comprising:
   a device cover including a device cover identifier, wherein the device cover identifier includes a translucent portion of the device cover;
   a computing device including a device cover identifier reader operable to read the device cover identifier, wherein the device cover identifier reader includes a camera of the computing device to receive light passing through the translucent portion of the device cover and determine one or more characteristic of the light passing through or reflected off the device, wherein the one or more characteristic of the light comprises a color distribution, an intensity, and a polarity of the received light, and the computing device further operable to invoke a user environment associated with the device cover identifier in response to reading the device cover identifier, wherein the combination of two or more received characteristics of the light is required to determine the invoked user environment, wherein at least one of the two or more received characteristics of the light required to determine the invoked user environment comprises the polarity and wherein the user environment includes computing device notification settings, computing device or application usernames and passwords, and computing device brightness levels;

detecting a triggering event, wherein the triggering event comprises a portion of the device cover being removed from the face of the computing device;

in response to detecting the triggering event, reading the device cover identifier with the device cover identifier reader; and invoking the user environment associated with the device cover identifier based on the detected triggering event.

2. A system in accordance with claim 1,
wherein the device cover identifier includes one or more magnets, and
wherein the device cover identifier reader includes one or more magnetic field detectors.

3. A system in accordance with claim 1,
wherein the device cover identifier includes a radio frequency identification (RFID) tag, and
wherein the device cover identifier reader includes an RFID reader.

4. A system in accordance with claim 1,
wherein the device cover identifier includes textual or graphical information, and
wherein the device cover identifier reader includes a camera of the computing device to read the textual or graphical information.

5. A method for invoking a computing device user environment based on a device cover identifier, the method comprising:
utilizing a device cover including a device cover identifier, wherein the device cover identifier includes a translucent portion of the device cover;
utilizing a computing device including a device cover identifier reader operable to read the device cover identifier, wherein the device cover identifier reader includes a camera of the computing device to receive light passing through the translucent portion of the device cover and determine one or more characteristic of the light passing through or reflected off the device, wherein the one or more characteristic of the light comprises a color distribution, an intensity, and a polarity of the received light, and the computing device further operable to invoke a user environment associated with the device cover identifier in response to reading the device cover identifier, wherein the combination of two or more received characteristics of the light is required to determine the invoked user environment, wherein at least one of the two or more received characteristics of the light required to determine the invoked user environment comprises the polarity;
a computing device detecting a triggering event, wherein the triggering event comprises a portion of the device cover being removed from the face of the computing device;
in response to detecting the triggering event, reading the device cover identifier with the device cover identifier reader; and
invoking the user environment associated with the device cover identifier based on the detected triggering event, wherein the user environment includes computing device notification settings, computing device or application usernames and passwords, and computing device brightness levels.

6. A method in accordance with claim 5,
wherein the device cover identifier in the reading step includes one or more magnets, and
wherein the device cover identifier reader includes one or more magnetic field detectors.

7. A method in accordance with claim 5,
wherein the device cover identifier in the reading step includes a radio frequency identification (RFID) tag, and
wherein the device cover identifier reader includes an RFID reader.

8. A method in accordance with claim 5,
wherein the device cover identifier in the reading step includes textual or graphical information, and
wherein the device cover identifier reader includes a camera of the computing device to read the textual or graphical information.

9. A computer program product for invoking a computing device user environment based on a device cover identifier, the computer program product comprising:
one or more non-transitory computer-readable storage media and program instructions stored on the one or more computer-readable storage media, the program instructions comprising:
program instructions to utilize a device cover including a device cover identifier, wherein the device cover identifier includes a translucent portion of the device cover;
program instructions to utilize a computing device including a device cover identifier reader operable to read the device cover identifier, wherein the device cover identifier reader includes a camera of the computing device to receive light passing through the translucent portion of the device cover and determine one or more characteristic of the light passing through or reflected off the device, wherein the one or more characteristic of the light comprises a color distribution, an intensity, and a polarity of the received light, and the computing device further operable to invoke a user environment associated with the device cover identifier in response to reading the device cover identifier, wherein the combination of two or more received characteristics of the light is required to determine the invoked user environment, wherein at least one of the two or more received characteristics of the light required to determine the invoked user environment comprises the polarity;
program instructions to detect a triggering event, wherein the triggering event comprises a portion of the device cover being removed from the face of the computing device;
program instructions, in response to detecting the triggering event, to cause the device cover identifier reader to read the device cover identifier; and
program instructions to invoke the user environment based on the detected triggering event associated with the device cover identifier, wherein the user environment includes computing device notification settings, computing device or application usernames and passwords, and computing device brightness levels.

10. A computer program product in accordance with claim 9,
wherein the device cover identifier includes one or more magnets, and
wherein the device cover identifier reader includes one or more magnetic field detectors.

11. A computer program product in accordance with claim 9,
wherein the device cover identifier includes a radio frequency identification (RFID) tag, and
wherein the device cover identifier reader includes an RFID reader.

12. A computer program product in accordance with claim 9,
wherein the device cover identifier includes textual or graphical information, and
wherein the device cover identifier reader includes a camera of the computing device to read the textual or graphical information.

\* \* \* \* \*